D. McC. SMYTH, DEC'D.
D. G SMYTH, ADMINISTRATOR.
APPARATUS FOR PREPARING FRUIT.
APPLICATION FILED JUNE 19, 1907.

981,130.

Patented Jan. 10, 1911.

2 SHEETS—SHEET 1.

Witness:
Chas. S. Lipley
Geo. B. Smyth

Inventor;
David M. Smyth
Per F. W. H. Clay  att'y

D. McC. SMYTH, DEC'D.
D. G SMYTH, ADMINISTRATOR.
APPARATUS FOR PREPARING FRUIT.
APPLICATION FILED JUNE 19, 1907.

981,130.

Patented Jan. 10, 1911.

2 SHEETS—SHEET 2.

Witness:
Chas. S. Ripley
Geo. B. Smyth

Inventor:
David M. Smyth
Per J.W.H. Cley atty.

UNITED STATES PATENT OFFICE.

DAVID McCONNELL SMYTH, OF ATLANTA, GEORGIA; DAVID G. SMYTH, ADMINISTRATOR OF SAID DAVID McCONNELL SMYTH, DECEASED, ASSIGNOR TO THOMAS C. MILLER, OF ATLANTA, GEORGIA.

APPARATUS FOR PREPARING FRUIT.

981,130. Specification of Letters Patent. Patented Jan. 10, 1911.

Application filed June 19, 1907. Serial No. 379,709.

*To all whom it may concern:*

Be it known that I, DAVID M. SMYTH, a citizen of the United States, residing at Atlanta, Georgia, have invented a certain new and useful Apparatus for Preparing Fruit, of which the following is a specification.

My invention relates to the art of preserving fruit and preparing it for shipment, and particularly to means for slicing and drying the flesh, and removing the undesirable parts.

I have illustrated herein a machine especially designed to prepare strawberries, for example, and my principal object is to automatically remove the hulls and slice the flesh of the fruit in sections for efficient drying and further treatment for preserving and shipping.

Figure 1:
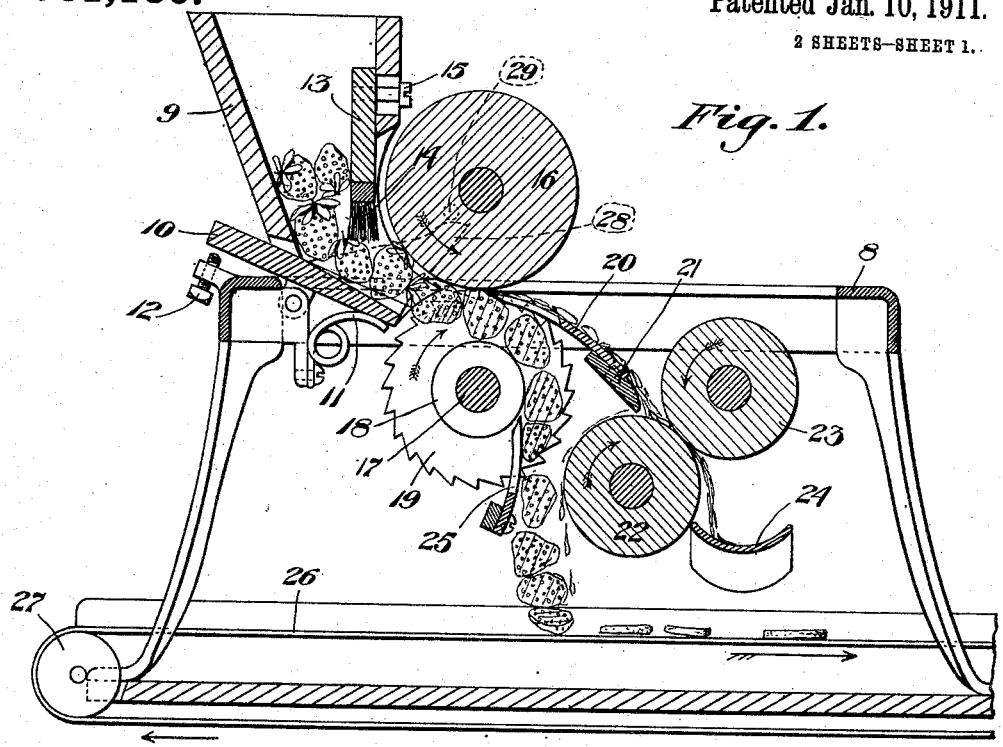
Figure 2:
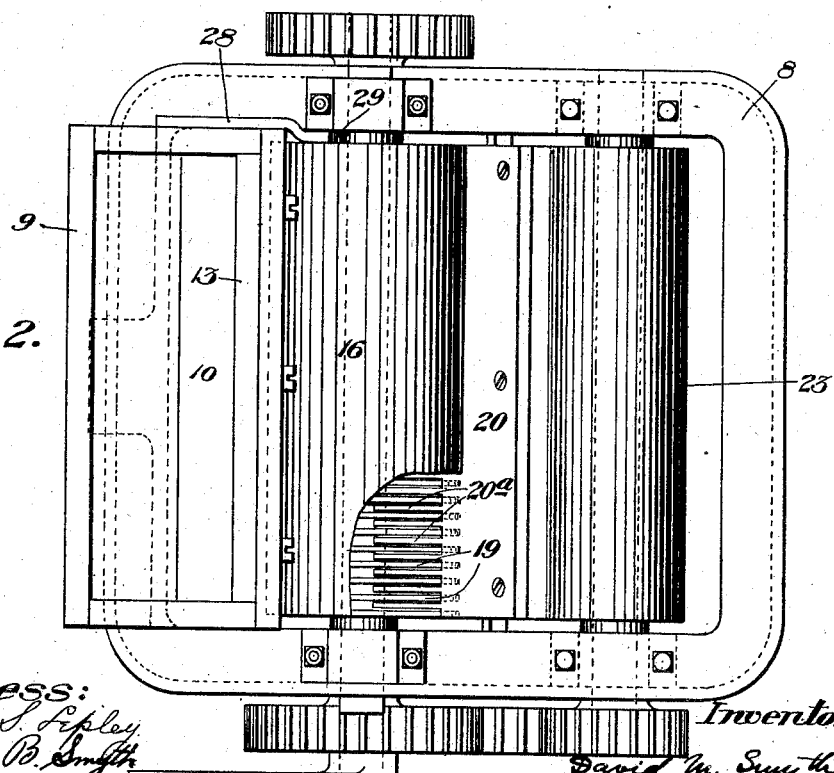
Figure 3:
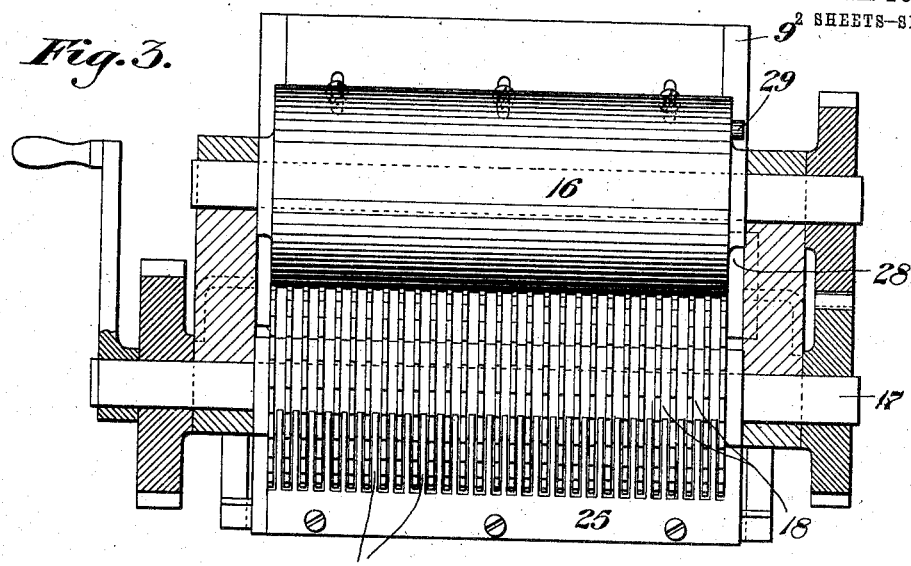
Figure 4:
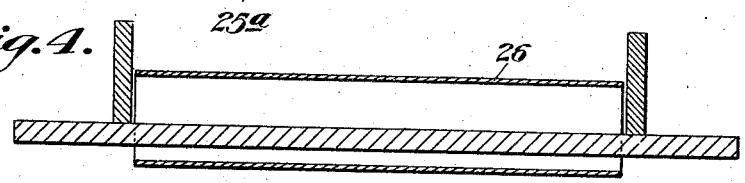
Figure 5:
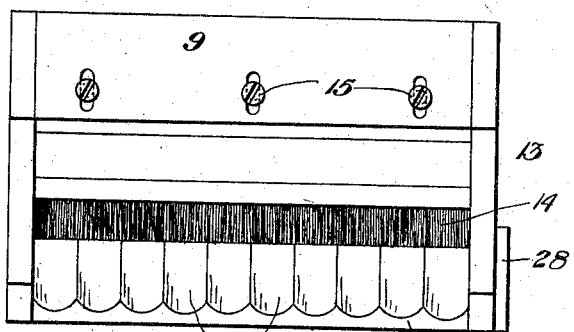
Figure 6:
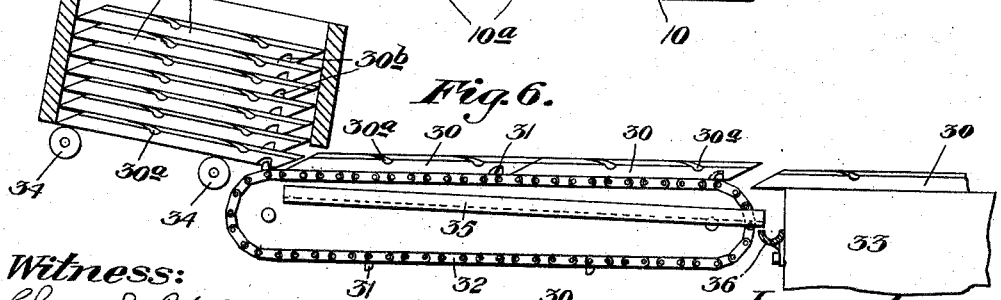
Figure 7:
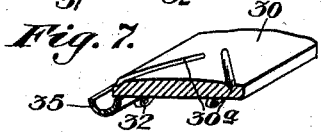

In the accompanying drawings Figure 1 is a vertical section of a simple form of machine for my purpose, and Fig. 2 is a plan view with a part of the main roller cut away. Fig. 3 is a front elevation of the main roll and the gang of saws in Fig. 1. Fig. 4 is a vertical cross-section of a conveyer, and Fig. 5 is a front view of the hopper and its vibrating spring bottom, in Fig. 1. Fig. 6 shows a preferred form of conveyer, serving also for subsequent handling, and Fig. 7 is a section of the conveying boards.

In carrying out the process of drying fruit it is advisable to avoid crushing the flesh, and I preferably slice the flesh of the fruit, in order to conveniently and quickly dry it out, and the present machine is designed for this purpose, being particularly adapted for operation upon strawberries.

In Fig. 1, mounted upon a convenient frame 8, is a hopper 9 which has a pivoted inclined base 10 provided with corrugations or grooves 10$^a$ as shown in Fig. 5, and being resiliently supported upon a spring 11 which holds it upward against the weight of the berries, and its inclination and scope of movement are regulated by the screw 12, while it is vibrated by engagement of its arm 28, with a moving part on one of the revolving rolls, such as the pin 29. The front side of the hopper is closed by a sliding gate 13 carrying a brush 14 and adjustable in vertical position by the set screws 15. From the hopper, as the bottom vibrates, the berries pass under the brush 14 and beneath a roller 16, preferably made of wood, and are operated upon by separating means such as the gang of saw blades 19, which are mounted upon shaft 17 and separated by collars or bushings 18. The saws rotate backward as shown and are used to slice the berries in narrow strips, and at the same time place them in position to remove the hulls, carrying them over the teeth 20$^a$ of a comb plate 20, which teeth extend between the saws so as to cut the meat of the fruit loose from the hull. The flesh of the berries being soft may easily be sliced and enter between the blades or saws, while the hulls being hard and woody are not cut, and cannot enter between the blades, but by the rolling of the berry the hulls are brought to the outer position and forced between the roller 16 and gang of saws and thence pass over the comb 20 and its supporting bar 21 and are then passed through a squeezing device such as the pair of rolls 22, 23, preferably made of yielding material. The juice is thus pressed out and the dry hulls are dumped into a waste trough 24. The flesh of the berry is sliced neatly and this also removes part of the juice, and as the flesh passes downward it is pushed out from between the saw blades by the teeth of the comb 25 and drops upon a conveyer 26 which is moved continuously underneath by any convenient means such as rollers 27 and carried off to be dried. The juice from the pressure rolls of course also drops on the conveyer with the berries, and some means of carrying off the juice separately is provided.

In Fig. 6 I have shown a preferred form of conveyer consisting of a series of wooden boards 30 having drainage grooves 30$^a$ and being provided with means such as saw-cuts 30$^b$ which are engaged by lugs 31 on traveling chains 32, so that the boards are moved under the machine to receive the berries and also serve as trays for handling them in drying process after they are pushed off onto the table 33 as will be evident. To the left of the conveyer I may provide a rack containing a number of the boards 30 as shown, stacked up in inclined position on rollers 34, so that as the properly spaced lugs 31 come along they pull out one at a time. The grooves 30ª carry the juice to the troughs 35 whence it may flow off through cross-trough 36.

By the mechanism described I preserve the original shape and condition of the berry to some extent, while reducing it to a state for easy and quick drying and sterilizing, and also efficiently remove the hulls, preserve all the juice of the fruit, to be also sterilized, and put up the fruit in a condition with all of its original ingredients. The consumer therefore by restoring the juice to the flesh can prepare the fruit for eating in very nearly its original condition. It is believed to be new to automatically hull the berries, as well as to slice them in thin layers, and separate the juice without crushing; and many other advantages will readily occur to those familiar with the art of preserving and transporting fruits. But

Having thus described my invention and illustrated its use, what I herein claim as new and desire to secure by Letters Patent, is the following:—

1. Means for slicing and hulling fruits, comprising a roller, and a gang of saws coöperating therewith to slice the fruit and bring the hulls against the roller, means adjacent to the roller to cut the hulls from the flesh and means to remove the flesh from the saws.

2. A berry hulling machine comprising a pair of co-acting rollers, one of the rollers having means to slice the fruit, a comb with its teeth located between the rollers and adapted to cut the hulls from the flesh as they are carried by the slicing means, and a conveyer to carry away the hulls, substantially as described.

3. The combination of a roller, a coöperating gang of saws properly spaced and adapted to slice fruit and a comb coöperating with the saws to remove hulls from the fruit and separate means for removing the flesh from the saws.

4. The combination of a roller, and a gang of saws coöperating therewith, and adapted to slice the berries, a series of teeth between the saws and close to the roller, and another series of teeth between the saws adapted to remove the flesh from the saws.

5. The combination with a gang of toothed knives adapted to slice fruit, of a roll coöperating with said knives, a comb to remove fruit hulls from the outside surfaces of the knives, and to cut the hulls from the flesh, means to remove the flesh from between the knives, and means to carry off the flesh and the juice from the hulls separately.

6. A fruit preparing machine comprising feeding means, a pair of rolls, of which one is provided with knives adapted to slice the fruit and push the hulls against the other roller, means operating on the sliced fruit to separate the hulls therefrom while the flesh is between the knives, and means to remove the flesh from the slicing means.

7. A fruit preparing machine comprising a roller, a coöperating gang of slicing knives with teeth, adapted to drag fruit hulls against the roller, a comb coöperating with the roll and knives to separate the hulls from the flesh, means to carry off the hulls and a conveyer for the sliced fruit, substantially as described.

In testimony whereof, I have hereunder signed my name in the presence of the two subscribed witnesses.

DAVID McCONNELL SMYTH.

Witnesses:
CHAS. S. LEPLEY,
F. W. H. CLAY.